March 27, 1945.    M. S. MERRILL ET AL    2,372,509
PRESS FOR AUTOMOTIVE VEHICLE HOUSINGS AND ASSOCIATED PARTS
Filed March 30, 1942    3 Sheets-Sheet 1
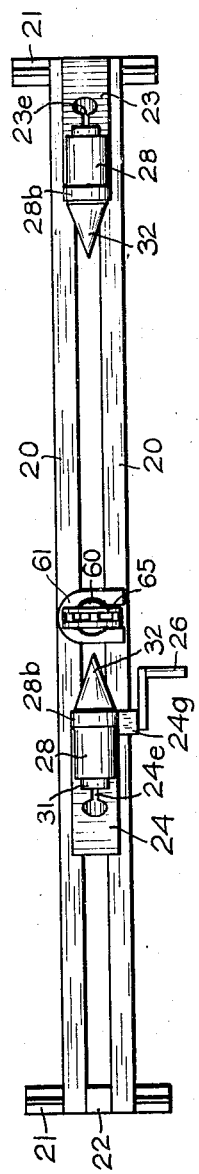
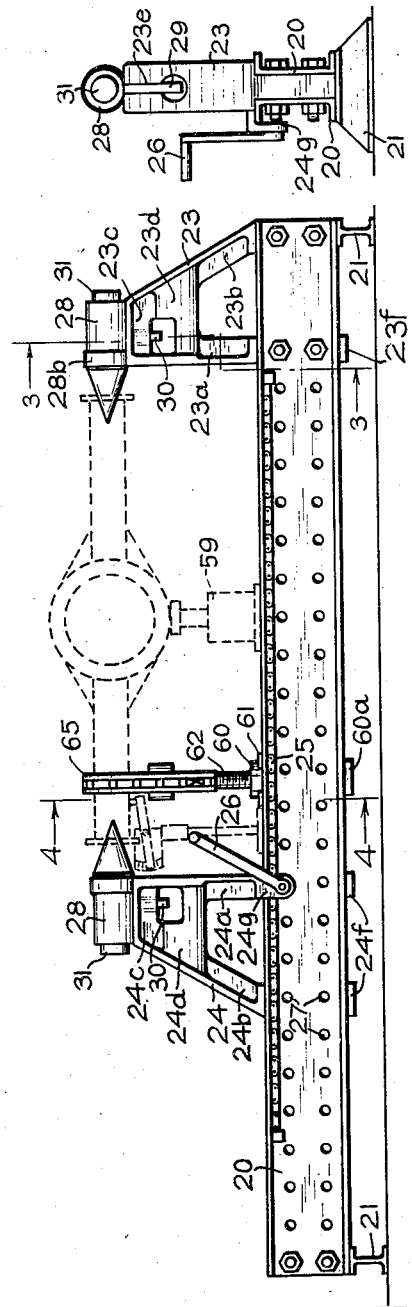
MARCELLUS S. MERRILL,
LAWRENCE W. ALFRED,
INVENTORS,
BY WHITEHEAD & VOGL
ATTORNEYS
PER *Earle Whitehead*

March 27, 1945. M. S. MERRILL ET AL 2,372,509
PRESS FOR AUTOMOTIVE VEHICLE HOUSINGS AND ASSOCIATED PARTS
Filed March 30, 1942 3 Sheets-Sheet 2

MARCELLUS S. MERRILL,
LAWRENCE W. ALFRED,
INVENTORS,

BY WHITEHEAD & VOGL
ATTORNEYS
PER Earle Whitehead

March 27, 1945. M. S. MERRILL ET AL 2,372,509
PRESS FOR AUTOMOTIVE VEHICLE HOUSINGS AND ASSOCIATED PARTS
Filed March 30, 1942 3 Sheets-Sheet 3
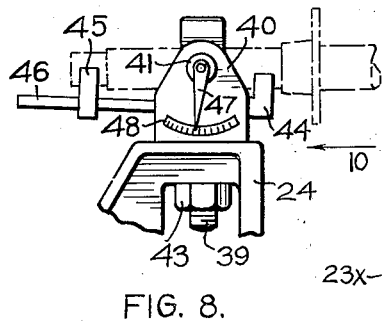
FIG. 8.
FIG. 10A.
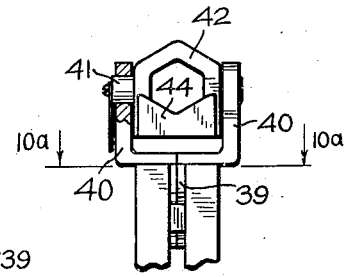
FIG. 10.
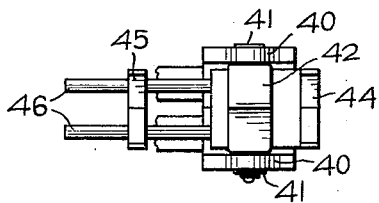
FIG. 9.
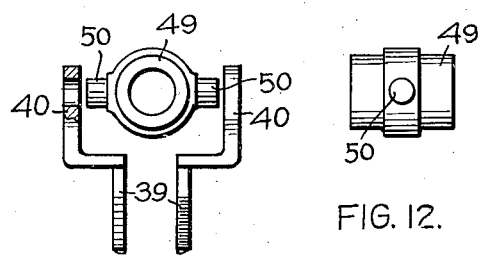
FIG. 11. FIG. 12.
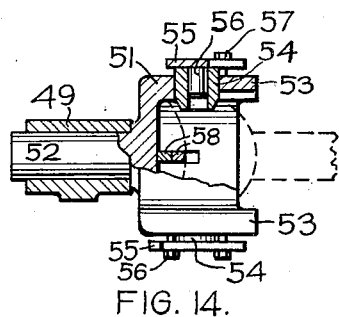
FIG. 14.
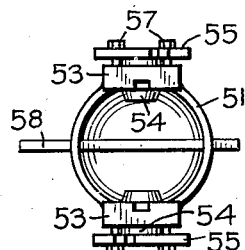
FIG. 15.
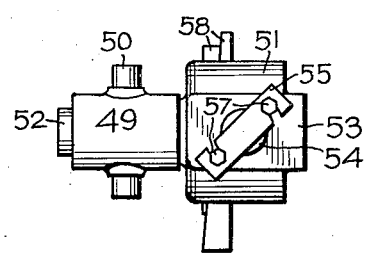
FIG. 13.
MARCELLUS S. MERRILL,
LAWRENCE W. ALFRED,
INVENTORS,
BY WHITEHEAD & VOGL
ATTORNEYS
PER *Carl Whitehead*

Patented Mar. 27, 1945

2,372,509

UNITED STATES PATENT OFFICE 2,372,509

PRESS FOR AUTOMOTIVE VEHICLE HOUSINGS AND ASSOCIATED PARTS

Marcellus S. Merrill and Lawrence W. Alfred, Denver, Colo.

Application March 30, 1942, Serial No. 436,896

12 Claims. (Cl. 153—32)

This invention is a development from and an improvement on apparatus of the type disclosed in our Patent No. 2,219,191 dated October 22, 1940, and has as an object to provide an improved press adapted to position, hold, and operate upon rods, bars, shafts, tubes, axles, and housing assemblies requiring bending or straightening.

A further object of the invention is to provide an improved press particularly adapted for the correction of deformities in automotive axle and housing assemblies.

A further object of the invention is to provide an improved press of the character described arranged for convenient adjustment and adaptation to receive and operate upon automotive structural units and assemblies of various sizes, forms, and specific constructions.

A further object of the invention is to provide an improved press of the character described arranged for selective association with a variety of adapters and accessories wherein and whereby various automotive units and assemblies may be operatively mounted and positioned in the press.

A further object of the invention is to provide an improved press of the character described which is so arranged as to facilitate precision gaging of the work done by and in said press.

A further object of the invention is to provide an improved press of the character described susceptible of exerting and accommodating pressures of a magnitude sufficient to accomplish correction of relatively massive units and structures.

A further object of the invention is to provide an improved press of the character described which is free from elements of superstructure that might interfere with mounting of work in the press by means of cranes, hoist, and the like.

A further object of the invention is to provide an improved press of the character described in the form of a compact, unitary assembly susceptible of convenient positioning for use in any suitable location without the necessity for preparing special foundations, which comprises relatively few elements, which is rapid and efficient in operation throughout a wide field of specific applications, and which is durable in use.

With these and other objects in view, all of which will more fully hereinafter appear, our invention comprises certain novel constructions, combinations and arrangements of parts, as will be hereinafter fully described and claimed, and as illustrated in the accompanying drawings, in which Figure 1 is a plan view of a preferred embodiment of the improved press as assembled and arranged for practical use in connection with automotive units and assemblies of tubular type.

Figure 2 is a side elevation and Figure 2A is an end elevation of the construction shown in Figure 1, an automotive housing assembly, jack, and gaging means being indicated, by broken lines in Figure 2, in operative relation with the press.

Figure 8 is a fragmentary, detail elevation of work mounting, positioning, and gaging means advantageously employable with the press in place of or in association with means of the type shown in Figure 5.

Figure 9 is a plan view of the showing of Figure 8.

Figure 10 is an end view of the showing of Figure 8.

Figure 10A is a view on indicated line 10a—10a of Figure 10.

Figure 11 is an exploded end elevation of yet a different construction of work mounting and positioning means.

Figure 12 is a side elevation of the mounting sleeve shown in Figure 11.

Figure 13 is a plan view of a mounting head advantageously employable with the press for the holding and positioning of certain types of work therein.

Figure 14 is a side elevation, partly in section, of the construction shown in Figure 13.

Figure 15 is an end view of the showing of Figure 13.

Figure 3:
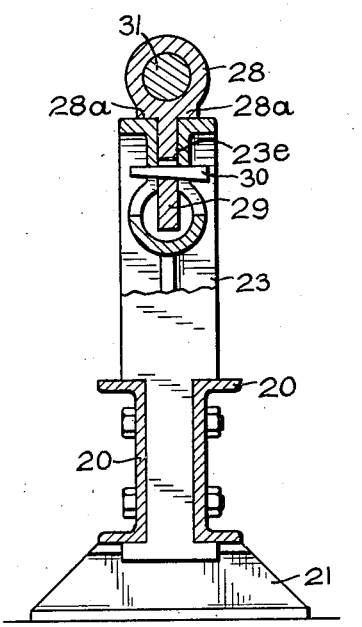
Figure 3 is a cross section, on an enlarged scale, taken on the indicated line 3—3 of Figure 2.
Figure 4:
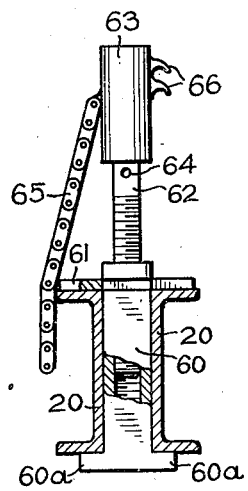
Figure 4 is a fragmentary, detail section, on the same scale as Figure 3, taken substantially on the indicated line 4—4 of Figure 2, certain elements of the assembly being positioned in Figure 4 somewhat differently from the showing of Figure 2, and portions of the construction shown in Figure 4 being broken away to better illustrate otherwise concealed elements and relationships.

The convenience and advantage of correcting distorted and deformed automotive elements and assemblies through the application of properly directed pressures thereto without heat-treating of the material to be corrected is well recognized, and such has become an established practice. Cold-straightening of metallic automotive components frequently requires the application of high pressures and necessitates careful checking and gaging of the corrective operation, and the new press hereinafter described is particularly designed to conveniently and efficiently meet all of the problems and considerations presented in the correction through cold-straightening of metallic elements and assemblies of various forms and sizes, particularly those comprised in automotive assemblies.

The various elements of the improved press are operatively associated with and carried by an elongate, horizontally-disposed, rigid frame composed of a pair of relatively-deep channel beams 20 disposed with their webs in spaced, parallel opposition and supported with their flanges horizontal on I-beam blocks 21 fixed transversely beneath the opposite ends of the beam assembly for engagement with a suitable supporting surface to position the channel beam assembly in parallel, spaced relation above said surface. A spacer block 22 is fixed between and rigidly secured to the beams 20 at one end of the frame assembly to maintain the corresponding ends of the beams in the desired spaced relationship, and spaced, depending legs of a fixed abutment 23 engage between and are securely bolted to the webs of the beams 20 at the other end of the frame to hold said beams in position to define a long, straight, vertically-opening slide bearing of uniform width between their webs and to simultaneously position and fixedly mount the abutment 23 on and above one end of the frame.

The abutment 23 may be of any specific shape and construction suitable to its purpose as hereinafter developed, and is illustrated as an integral assembly preferably formed by casting or moulding, and presenting an inner, transversely-flanged leg 23a rising vertically above the upper flanges of the beams 20 and bearing at its lower end against said beam flanges, a narrower downward extension which engages and is secured between the webs of the beams 20, and laterally-offset lugs 23f on the lower end of said extension positioned to engage beneath and bear against the lower flanges of said beams; an outer-transversely-flanged leg 23b co-planar with, spaced from, and converging upwardly toward the leg 23a, flanges on the lower portion of the leg 23b adapted to bear against upper flanges of the beams 20, and a narrower depending extension engaging in fixed relation between the webs of the beams 20; a transversely-flanged, horizontally-disposed head 23c extended longitudinally of the frame to bridge between and connect upper portions of the legs 23a and 23b and provide a flat bearing seat on its upper surface parallel with the plane of the top flanges of the beams 20; and a tubular boss 23d connecting between the legs 23a and 23b below the head 23c with its bore axially parallel with the seat on the head 23c and opening completely through the transverse flanges of the legs 23a and 23b.

The head 23c is divided into identical halves by means of a vertical slot 23e longitudinally intersecting said head and its transverse flange and communicating with the bore of the boss 23d, and (as clearly illustrated at Figs. 2 and 3) an upper inner portion of said boss is cut away to provide a transverse opening extending through and beneath the vertical web of the head 23c and in intersecting relation with a portion of said slot. The walls of slot 23e are arcuately recessed as at 23x Fig. 10A for the purpose later described.

A second abutment 24, including elements 24a, 24b, 24c, 24d, 24e and having recesses the same as 23x, structurally identical with the corresponding elements of the abutment 23, is slidably mounted on the beams 20 with its leg extensions engaging between the webs of said beams and with its vertical leg 24a in spaced opposition with the leg 23a of the fixed abutment. The leg extensions of the abutment 24 are preferably provided with laterally-offset lugs 24f which slidably engage beneath lower flanges of the beams 20, so that said abutment 24 is held against displacement away from its seat on the beams 20 and mounted to slide longitudinally along said beams.

For convenience in locating and moving the abutment 24 along its supporting flanges, an integral bracket 24g may be formed on the leg 24a to extend laterally from a lower portion of said leg across an upper flange of a beam 20 and thence downwardly across the margin of said flange to rotatably support and mount a spur wheel or pinion, not shown, adjacent the outer face of the web of the beam 20 and in spaced relation beneath the upper flange of said beam. A chain 25, or functionally equivalent rack means, is extended in fixed relation along and immediately beneath the upper flange of the beam 20 embraced by the bracket 24g and in position to be engaged by the teeth of the wheel or pinion carried by said bracket, so that, when said wheel or pinion is rotated by means of a crank 26 fixed to the outer end of its spindle, said wheel or pinion is caused to travel along the chain 25 and correspondingly move the abutment 24 longitudinally of its supporting frame.

In the performance of certain operations on the improved press, it is important that the abutment 24 be positively and securely held in a selected position, and for this purpose a double row of spaced holes 27 may be formed through the webs of the beams 20 in position to selectively register with corresponding holes, in or with the front or rear edges of, the leg extensions of said abutment, so that pins or bolts may be inserted through the holes 27 and aligned holes in the abutment leg extensions, or against the edges of said legs, to immovably secure the abutment to the frame in any one of a number of adjusted positions.

It is the function of abutments 23 and 24 to mount, position, and hold the various units and assemblies to be worked upon in predetermined relation with and above the base frame of the press, and the bearing seats on the upper ends of said abutments lie in a plane parallel with the upper plane of the base frame and are arranged to receive and operatively mount adapters designed to accommodate various shapes, sizes, and types of units and assemblies to be corrected. The various adapters include generally a mounting element engageable with the abutment head and an associated element for engagement with the work to be supported, and various types and arrangements of adapter assemblies are illustrated in Figures 5 to 15, inclusive, of the drawings.

The adapters illustrated in Figures 1, 2, 5, 6 and 7 are particularly desirable in the centering and mounting of tubular units and assemblies, and may be identical on each of the abutments. This type of adapter utilizes a mounting element consisting of a barrel 28 formed with a straight, uniform bore and provided with an exterior, radial flange 29 of a size to engage within the longitudinal slot bisecting the head of the abutment and to extend across the transverse opening intersecting the tubular boss of the abutment. The barrel 28 is formed with flat seat portions 28a, Fig. 3, at right angles to and at each side of the web 29 for engagement against the bearing seat formed by the upper flange of the abutment head, and the web 29 of each barrel is formed with a slot elongated somewhat radially of the barrel and disposed for registration of its lower portion with an upper portion of the transverse opening intersecting the abutment head web, so that a wedge 30 may be engaged through the hole in the web 29 to bear against the lower margin of the abutment head web to lock the barrel 28 in firmly seated relation against the bearing seat of the abutment head. If desired, one end of the barrel 28 may be thickened, as at 28b, to strengthen that portion of the barrel.

As is shown in Figures 1 and 2, a barrel 28, clamped to each of the abutment heads, may receive and mount a work-engaging centering device consisting of a cylindrical spindle 31 adapted to engage within and through the bore of its barrel 28, and a conical head 32, having a base greater in diameter than the spindle 31 to form a shoulder arranged to bear against one end of the barrel 28 and hold the centering device against movement in one direction through its barrel. The centering devices are arranged in the opposed barrels 28 so that their conical heads 32 are oppositely and inwardly directed, in which position said heads may be engaged within the ends of a tubular unit or assembly and the abutment 24 moved toward the abutment 23 until said conical heads are fully engaged and the unit to be worked upon consequently centered and supported in parallel relation with the upper surface of the base frame.

Figure 6:
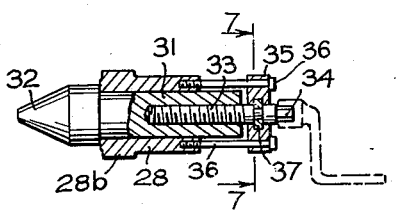
Figure 6 is a fragmentary, detail section taken on the indicated line 6—6 of Figure 5.
Figure 7:
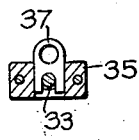
Figure 7 is a cross section taken on the indicated line 7—7 of Figure 6.
Figure 5:
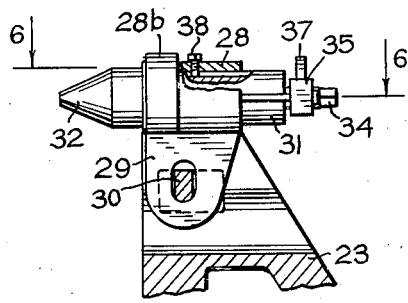
Figure 5 is a fragmentary, detail elevation, on the same scale as Figure 3 and partly in section, of adjustable means advantageously employed with the press for mounting and holding units and assemblies to be worked upon therein.

Since it may not at all times be possible to position and hold the abutment 24 with the head 32 of its adapter properly engaging the unit to be worked upon, the centering device may itself be arranged for axial adjustment relative to its barrel 28 in the manner shown in Figures 5, 6, and 7, and such adjustable centering devices may be utilized in mounted relation with either or both of the abutments. The adjustable centering device may include the spindle 31 and head 32 above described, in which case an axial, internally-threaded bore is formed in the spindle end remote from the head 32 and for threaded cooperation with an adjusting screw 33 formed with a tool-engageable head 34 on its outer end. A bearing block 35 is positioned, as by means of bolts 36 engaging with the end of the barrel 28 remote from the head 32 of the centering device, in spaced relation beyond and diametrically across the end of the spindle 31 carrying the screw 33, and said block is formed with a hole through which the headed end of said screw may freely engage and slide when the spindle 31 is moved axially of the barrel 28. Inwardly adjacent its head 34 the screw 33 is formed with a circumferential grove, and the block 35 is formed with a transverse slot at right angles to the axis of the screw 33 and adapted at times to register with the circumferential groove carried by said screw, so that a clip 37, notched at one end to engage its furcations in the circumferential groove of the screw 33, may be inserted in said transverse slot and engaged with said groove to hold the screw 33 against axial displacement through the block 35. With the screw 33 thus held in the block 35, rotation of said screw, as by means of a handle or wrench engaging its head 34, will operate to move the spindle 31 axially toward and away from the block 35, a set screw or pin 38 engaging radially through the barrel 28 and within a longitudinal groove formed on the spindle 31 serving to prevent rotation of said spindle within its barrel when the screw 33 is rotated.

A type of adapter designed to receive and support axle assemblies and to facilitate gaging of their spindles or sleeves is shown in Figures 8, 9 and 10. In this construction, a threaded stem 39, of a size to be rotatively received in recesses 23x in the walls of slot 23e bisecting the head of an abutment and of a length to project within the transverse opening below the abutment head web, is divided longitudinally and each half of said stem engages and is fixed to an angular bracket arm 40, so that when the halves of the stem are brought into registration, the bracket arms 40 cooperate to form a U-shaped yoke opening away from the stem 39 and having flat portions on each side of said stem arranged to engage the bearing seat on the head of an abutment. Aligned holes are formed in the parallel portions of the bracket arms 40 and adjacent the ends of said portions to receive and rotatably mount studs 41 extending oppositely from an hexagonal yoke 42, which yoke may thus be supported by and for oscillation in the bracket arms 40. With the yoke 42 assembled between the parallel portions of the bracket arms 40, the assembled adapter may be mounted on an abutment head with its stem 39 rotatively seated in recesses 23x in the walls of the slot in said head and extending into the transverse opening beneath the head web. A nut 43 may be engaged on the stem 39 for holding the halves of stem 39 in fixed interrelation as a stem and may be tightened into clamping relation against the lower margin of the head web to firmly hold the adapter assembly on the abutment.

To facilitate use of the adapter just described in the gaging and truing of axle spindles, and the like, an upwardly-opening V-shaped seat 44 is fixedly associated in spaced relation with the inner side of the lower portion of the yoke 42, and a similar seat 45 is slidably carried on rods 46 fixedly projecting from the opposite side of the yoke lower portion, so that an axle spindle inserted through the yoke 42 may engage at its inner and outer extremities with the seats 44 and 45, respectively, and tilt the yoke assembly to a degree corresponding to the angular displacement of such spindle from a true line connecting between corresponding points on the spaced abutments, an indicator finger 47, fixed to one of the studs 41 and overlying an outer surface of a bracket arm 40 for registration with a scale 48 carried by said arm, being provided to facilitate reading of the angular deviation registered by the spindle.

Certain types of axles are provided with spindles normally disposed out of alignment with the axle, in which case the indication readable from the relation of the finger 47 with its scale 48, when the axle spindles are seated in the seats 44 and 45, may be employed to determine and check the angular displacement of said spindles relative to their axle, the yoke 42 being free to pivot about its horizontal axis for accommodation of the angular displacement of the axle spindles. Similarly, bent and distorted axles and spindles may be mounted in the adapters and their displacement from a normal right line accommodated by the pivotal mounting of the yoke 42, in which case the indication of the finger 47 serves to determine the degree or amount of distortion. In truing or correcting units and assemblies mounted in the adapters just described, it is frequently desirable to rotate such units and assemblies within the adapters and without removal of the work from its mounting, and such rotation is made possible, when the work includes angularly-displaced spindle or other portions, by the swivelling engagement of the stem 39 through the recesses 23x in the head web of the associated abutment, said stem being held by said recesses against travel longitudinally along the head web slot and being free to rotate about a vertical axis to the degree necessary to accommodate rotation of the work with its angularly-displaced elements. The provision of both horizontal and vertical axes about which the adapter or certain of its elements may rotate results in a universal joint connection between the supporting abutment and the work mounted thereon, thus facilitating rotation and positioning of the work without its removal from its mounting. As will be apparent, the finger 47 may be employed to check the alignment of either straight or angularly-displaced axle spindles. When the degree of correct displacement or camber of the spindle is known, the finger 47 can be adjusted accordingly on the scale and the point to which it is adjusted may be taken as the base point whether it be the center or some other point on the scale. When the finger is thus adjusted to the selected base point and an axle distorted from the normal condition is seated in the yoke and seats, the finger will move to one side of the base point and indicate the degree of such distortion. Rotation of the axle in the seats 180 degrees will cause the finger to move to a corresponding reading on the other side of the selected base point. Any distortion and the degree thereof may be ascertained by this structure.

The mounting element provided by the stem 39 and associated bracket arms 40 may be employed for the operative support of work-engaging means other than the yoke 42 and its associated elements, and Figures 11 and 12 illustrate one such alternative arrangement. In place of the yoke 42, a tubular sleeve 49, preferably reenforced by means of an annular band about its midportion, is provided with diametrically-aligned, radial studs 50 engageable within the holes in the parallel portions of the bracket arms 40, whereby said sleeve 49 may be mounted on the abutments for oscillation in a vertical plane and with the axis of its bore susceptible of alignment in predetermined angular or in parallel relation with the base frame upper surface. The sleeves 49 may be utilized to receive and support shafts, rods, and other units and assemblies having terminal portions engageable through the bores of said sleeves, and may also be employed to receive, position and mount other specific work-engaging adapters such, for example, as those of the type shown in Figures 13, 14 and 15.

Modern automotive construction frequently includes axle units and assemblies adapted to pivotally engage by means of king-pins with steerable wheel mountings, and in the straightening or correction of such units and assemblies it is essential that the king-pin alignment and its angular relation to the unit or assembly be controlled. For this purpose, a work-engaging element of the type shown in Figures 13, 14 and 15 is of particular advantage, and such element is shown as including an open-end, cylindrical cup 51 of a size to receive and telescope over the yoke or ball end of the unit or assembly to be corrected, and an axle spindle 52 extending from the base of said cup for engagement with the bore of a tubular sleeve 49. The cup 51 is formed with extended, thickened webs or plates 53 in diametric relation on its wall portions, and said webs are intersected by registered holes aligned diametrically of the cup. Plugs 54, of varying sizes and specific shapes, are formed with tapered inner ends and are adapted for insertion through the holes in the webs 53 to engagement of their tapered ends within the ends of the king-pin bearing holes in the axle unit or assembly, thereby mounting the spindle 52 in perpendicular relation with the axis of the king-pin bearing, and notched clips 55, each formed with a perpendicularly-related, central stud 56 engageable within the axial bore of an associated plug 54, are provided or engagement with bolts 57, projecting in suitably spaced relation exteriorly of the webs 53, to overlie and retain the associated plug 54 in its inserted relation through said web. To further secure and hold the cup 51 on and in the desired relation with the axle end, slots may be formed through diametrically-opposite portions of the cup wall adjacent the cup base, and wedges 58 may engage through said slots in bearing relation with the end of the axle to tighten said axle against the plugs 54.

Utilizing any of the adapters suited to the purpose, a unit or assembly to be corrected may be mounted, positioned and held in the press in predetermined relation with the upper surface of the base frame and in such manner as will permit of its rotation in the press about an axis centering through the adapters. The upper surface of the base frame between the abutments and beneath the mounted work provides a base whereon a jack 59 may be seated to exert upward pressure against a selected point on the work. Since the corrective pressures required in certain instances may attain considerable magnitude, and since such pressures need, in certain instances, to be applied through lever arms of varying lengths and about fulcrums variously positioned along the work, it is neither practical nor desirable to construct the abutments and adapters of the press, in themselves, to withstand the corrective pressures, and hence means are provided for holding the work at selected points against separation from the base frame under the action of the jack 59. While but one of the holding devices is illustrated in the drawings and hereinafter described it is to be understood that such devices may be employed in such manner as may prove desirable in a given operation.

A preferred type of holding device is illustrated as comprising an angular base block 60 engageable in the slot between the webs of the beams 20 and provided with laterally-extending lugs 60a on its lower end adapted to engage beneath the lower flanges of said beams and limit upward displacement of the block 60 while permitting said block to slide longitudinally of the base frame. The upper end of the block 60 extends above the upper flanges of the beams 20 and is notched on opposite sides to accommodate the spaced arms of a retainer plate 61 which overlies the upper flanges of the beams 20 and serves to hold the block 60 with its lower end flanges closely adjacent the lower beam flanges. The block 60 is formed with an internally-threaded bore opening through its upper end to threadedly receive and accommodate a vertical stem 62 which carries a head 63 on and in swiveled, non-separable relation with its upper end. The stem 62 is provided with any suitable means, such as a hole 64 adapted to receive a bar, whereby said stem may be rotated for altitudinal adjustment of the head 63, and said head is provided with means, such as a chain 65 secured at one end to said head and adjustably engageable with fingers 66 on the opposite side of the head, for connection with a selected point on the work mounted in the press in a manner which will hold said point, after proper adjustment of the stem 62, against variation in its spacing above the base frame. Holding devices of the functional type just above described may be operatively associated with the press in such number and relative positions as may be desirable for a given corrective operation, provision of the notched upper end on the block 60 for cooperation with the retainer plate 61 facilitating removal and replacement of such devices relative to the base frame.

Through selection and use of proper adapters, the improved press may conveniently be employed to mount, position, hold, and apply corrective pressure to units and assemblies of various sizes, shapes, and specific constructions, and the mounting provided by the improved press permits free use of gages of different types for checking the corrective operations without removal of the work from the press. In certain automotive assemblies, coaxial elements are pressed into interengagement, and the tubular bosses 23d and 24d provided in the abutments facilitate separation of such frictionally-engaged elements in the manner set forth in our earlier patent.

Since changes, variations, and modifications in the form, construction, and arrangement of the elements shown and described may be had without departing from the spirit of our invention, we wish to be understood as being limited solely by the scope of the appended claims, rather than by any details of the illustrative showing and foregoing description.

We claim:

1. In apparatus of the character described having a base frame, abutments upstanding in adjustably-spaced relation from said frame, longitudinally and laterally flanged, coplanar seats on the upper ends of said abutments, slots opening upwardly through and longitudinally bisecting said seats, and transverse openings in said abutments intersecting lower portions of said slots, adapters engageable with said abutment seats to position and mount a unit to be worked upon in bridging relation between said abutments, said adapters each comprising a substantially tubular barrel, a flange radially depending from said barrel and engageable within the slot and extending into obstructing relation with said transverse opening when the barrel is seated, means for securing said extension of said flange to clamp said barrel against its seat, a spindle slidably receivable in the bore of said barrel, and an enlarged, conical head on one end of said spindle.

2. In apparatus as defined in claim 1, means for adjusting said spindle axially of said barrel, said means comprising a pin threaded into and projecting axially from the rear end of said spindle, a bearing block fixed in spaced relation with said barrel and behind said spindle, the projecting end of said pin being so mounted in said block as to permit rotation but prevent longitudinal movement of the pin, means for rotating the pin, and means to hold the spindle against rotation relative to the barrel.

3. In apparatus of the character described having a base frame, adjustably-spaced abutments upstanding from said frame, coplanar seats on the heads of said abutments, a slot longitudinally bisecting each of said seats, and transverse openings in said abutments intersecting lower portions of said slots, work-engageable adapters mountable on said abutments to position a unit to be worked upon in bridging relation therebetween, said adapters each comprising a longitudinally-bisected stem engageable within the slot and projectable into said transverse opening, a bracket arm carried by each half of said stem and cooperating to form an upwardly-opening yoke when said stem portions are assembled in the slot, means for holding said halves in interengagement as a stem, aligned trunnion seats in the upstanding arms of said yoke, and a tubular sleeve trunnion-supported in said trunnion seats for oscillation within said yoke.

4. In apparatus of the character described having a base frame, adjustably-spaced abutments upstanding from said frame, coplanar seats on the heads of said abutments, a slot longitudinally bisecting each of said seats, interrelatively registered arcuate recesses interrupting opposed margins of said slot, a transverse opening in said abutments intersecting lower portions of said slot, work-engageable adapters of universal joint type mountable on said abutments to position a unit to be worked upon in rotatable bridging relation therebetween, said adapters each comprising a stem rotatably seatable in the arcuately-recessed portion of the abutment seat slot, a U-shaped yoke on and opening upwardly from said stem, and a receiving element pivotally mounted between the arms of said yoke for oscillation through a vertical arc.

5. In apparatus as defined in claim 4, said receiving element comprising a hanger, an upwardly-opening seat fixedly carried by and in offset relation with said hanger, and a similar seat slidably carried by and in offset relation with the opposite side of the said hanger.

6. In apparatus of the character described having a base frame, adjustably-spaced abutments upstanding from said frame, coplanar seats on the upper ends of said abutments, work-supporting adapters removably associated with said seats, and axially-aligned, tubular elements in said adapters, mounting means engageable with axle ends to facilitate operative association of an axle with and in mounted relation between said adapters, said means comprising a spindle slidably engageable through a tubular adapter sleeve, a cup on and opening axially from one end of said spindle to receive an axle end, orifices aligned diametrically of said cup for registration with spindle pin holes in said axle, plugs slidable in said orifices and formed with tapered inner ends engageable with the spindle pin holes of an axle, lugs on the exterior of the cup, retainer clips centered in said plugs for engagement at times with said lugs, slots diametrically of the cup walls adjacent the base of said cup, and wedges engageable through said slots and with an axle end portion to firmly clamp the latter to and within said cup.

7. Apparatus of the character described, comprising a base frame, adjustably spaced, upstanding abutments mounted wholly within and upon said frame, the tops of said abutments forming co-planar seats, devices rigidly but removably secured to said seats and adapted to receive endwise and in axial alignment with said devices an article to be worked upon, means associated with said base for limiting separation between said base and selected points on the article engaged by said devices and means operative from said base for pressure-urging selected points on such article away from said base.

8. In apparatus as defined in claim 7, elements depending from the devices and recesses in said seats adapted to receive said elements.

9. In apparatus as defined in claim 7, elements depending from the devices, recesses in said seats adapted to receive said elements and means beneath said seats for securing said elements to the abutments whereby to secure the devices upon said seats.

10. In apparatus as defined in claim 7, webs depending from the devices, recesses in said seats adapted to receive the webs and co-ordinating orifices in the abutments and the webs adapted to receive a wedge and a wedge for wedging the webs in the recesses and the devices against the seats.

11. In apparatus as defined in claim 7, said base frame formed with a longitudinal, vertically-opening slot adapted for the adjustable mounting of one of said abutments and of said limiting means, and a horizontally-disposed upper surface adapted to seat said pressure urging means, the other abutment being affixed to said frame through one end of said slot.

12. In apparatus as defined in claim 7, tubular bosses longitudinally of said abutments in spaced, parallel relation with and beneath said seats, a vertical slot in each abutment extending from the seat into the bore of the tubular boss, each article receiving device having a positioning and securing element engageable within such slot to position its device on the seat.

MARCELLUS S. MERRILL.
LAWRENCE W. ALFRED.